United States Patent [19]

Srivastava

[11] 4,359,755
[45] Nov. 16, 1982

[54] GATING NETWORK FOR A SAMPLING CIRCUIT

[75] Inventor: Gopal K. Srivastava, Buffalo Grove, Ill.

[73] Assignee: Zenith Radio Corporation, Glenview, Ill.

[21] Appl. No.: 232,792

[22] Filed: Feb. 9, 1981

[51] Int. Cl.³ .................. H04N 9/535; H03K 5/00; H03K 5/18
[52] U.S. Cl. .................. 358/21 V; 358/178; 307/240; 307/353; 328/139; 328/151
[58] Field of Search .................. 358/10, 21 V, 27, 28, 358/178, 20; 307/240, 353, 239, 352, 246; 328/139, 151

[56] References Cited

U.S. PATENT DOCUMENTS 3,624,290 11/1971 Hofmann .................. 358/178

Primary Examiner—John C. Martin

[57] ABSTRACT

A gating network is described for enabling and disabling a conventional sampling circuit. The gating network includes a pulse generator which develops an enabling pulse in time synchronism with the signal to be sampled by the sampling circuit. The enabling pulse and the signal to be sampled are applied to an AND gate which develops a control signal whose duration is no longer than the signal to be sampled. The control signal is applied to the sampling circuit to enable its detection of the signal to be sampled.

9 Claims, 4 Drawing Figures

GATING NETWORK FOR A SAMPLING CIRCUIT

BACKGROUND OF THE INVENTION

The invention is generally directed to electronic sampling circuits such as sample and hold detectors, and particularly to a gating network for activating such sampling circuits for precise, selected intervals.

Conventionally, sampling circuitry is employed to sense the value of a selected portion of a signal received by the sampling circuitry. For example, a television signal containing a color burst followed by video information may be applied to a sampling circuit to sense the amplitude of the color burst. A gating network is usually provided to turn the sampling circuit on only during the color burst interval, thereby to inhibit sampling of the rest of the television signal. To turn on the sampling circuitry at the correct time, the gating network usually receives a gate pulse which is time coincident with the sampling component (the portion of the signal to be sampled).

One problem with conventional gating networks is the way they respond to impulse noise in the gate pulse. When such noise occurs, it may cause positive-going and negative-going noise spikes to appear both in the gate pulse and in the sampling component. A gating network which activates the sampling circuitry in response to positive-going gate pulses also ordinarily activates the sampling circuitry in response to positive-going noise spikes. Hence, the sampling circuitry will sense not only the sampling component but also a positive-going noise spike. A negative-going noise spike in the gate pulse causes the gating network to disable the sampling circuit for the duration of the negative-going noise spike. A corresponding negative-going noise spike in the sampling component is, therefore, not sensed by the sampling circuitry. This causes the output of the sampling circuit to be greatly influenced by the positive-going noise spike.

Another problem occurs when the duration of the sampling component is very short and the sampling circuitry is very fast. For example, if a conventional color burst of about 2.7 microseconds duration is to be sampled, the sampling circuitry must be turned on quickly when the color burst interval begins, and turned off no later than the end of the color burst interval. Holding the sampling circuitry on for longer than the color burst interval allows fast acting sampling circuitry to change its output to correspond to the signal value which occurs after the color burst. Hence, the sampling circuitry's output will tend to misrepresent the true value of the color burst.

For the foregoing reasons, conventional networks for gating sampling circuitry on and off tend to cause the sampling circuitry to develop unreliable outputs. This is particularly true when the signal to be sampled is of very short duration, and when impulse noise is present.

OBJECTS OF THE INVENTION

It is a general object of the invention to provide an improved gating network to activate and deactivate sampling circuitry.

It is a more specific object of the invention to provide such a gating network which is capable of activating its sampling circuitry for short, highly controllable intervals.

BRIEF DESCRIPTION OF THE FIGURES

The objects stated above and other objects of the invention are set forth with greater particularity in the following detailed description and in the accompanying drawings, of which.

DESCRIPTION OF THE PREFERRED EMBODIMENT

The gating network described below may be used in a variety of applications. It is particularly well suited for use in a color television receiver having a VIR (Vertical Interval Reference) correction system of the type described in U.S. application Ser. No. 231,635, filed Feb. 4, 1981. In such a correction system, the present gating network may be employed to gate on a sample and hold detector which samples the amplitude of VIR color bursts. The preferred embodiment of this invention is disclosed in that environment. Accordingly, reference is first made to FIG. 1 for an understanding of the VIR terminology which is used below.

Figure 1:
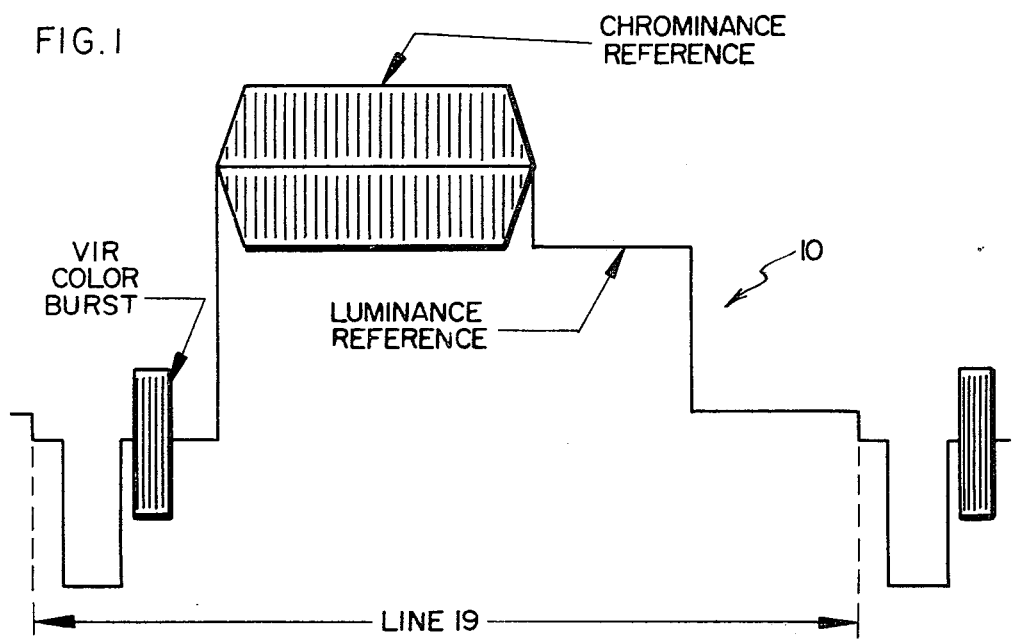
FIG. 1 illustrates a standard VIR signal of the type included on the nineteenth line of each television field.

FIG. 1 shows a VIR signal 10 of the type commonly transmitted on the nineteenth line of each television field. The illustrated line includes a VIR color burst whose frequency is about 3.58 megahertz and whose duration is about 2.7 microseconds. Following the color burst is a VIR chrominance reference of the same frequency. A luminance reference is transmitted immediately following the chrominance reference.

During the receiver's scan time, standard color bursts are transmitted whose frequency and phase are the same as the VIR color burst. In addition, video chrominance is also transmitted as a part of the composite television signal.

Figure 2:
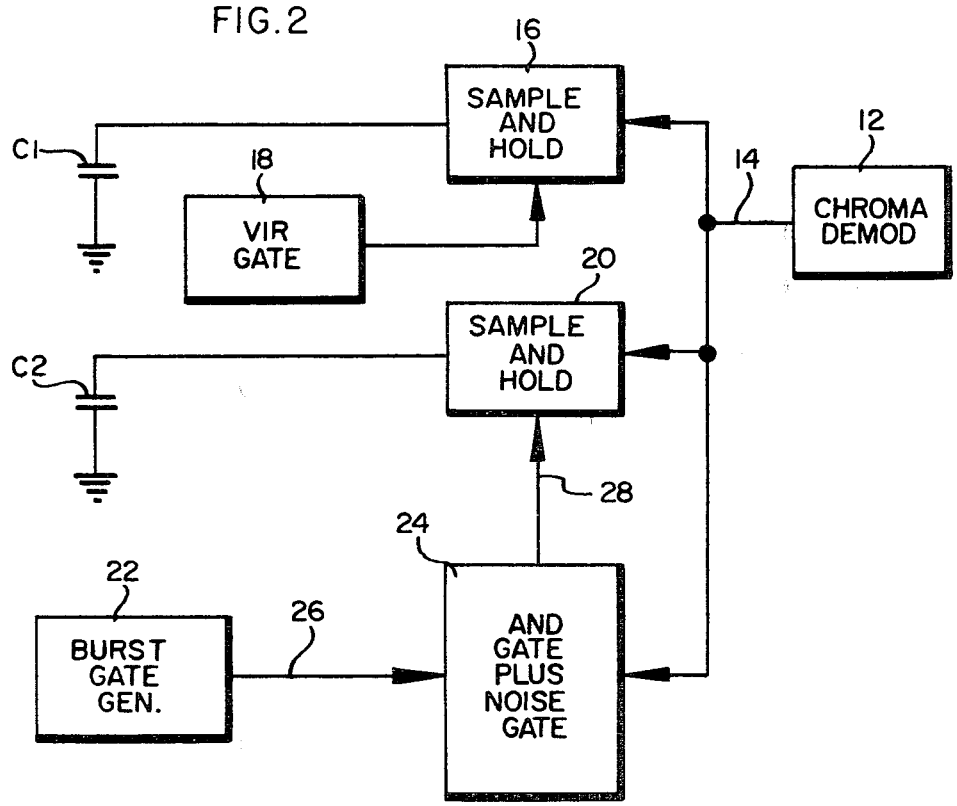
FIG. 2 is a block diagram which illustrates a gating network according to the invention and a sample and hold detector which is enabled by the gating network; a conventional gating network which enables another sample and hold detector is also shown to better illustrate the environment in which the preferred embodiment may be used.

Referring now to FIG. 2, a sampling circuit is shown of the type which may be used in the above-mentioned VIR correction system. The input to the sampling circuitry is derived from a chroma demodulator 12. This demodulator receives the VIR signal as well as the standard color bursts and video chrominance which are broadcast during the receiver's scan time. All such inputs appear as demodulated outputs on a lead 14.

A sample and hold detector 16 receives the demodulated signals on the lead 14 as well as a gating signal from a VIR gate 18. This gating signal is selected to activate the sample and hold detector 16 only during the interval of the VIR chrominance reference thereby to store on a capacitor C1 a voltage representative of the amplitude of the VIR chrominance reference. The demodulator 12 and the detector 16 operate as described more fully in the above-mentioned patent application and form no part of the present invention. They do, however, serve to illustrate the environment in which the present invention may be employed.

The demodulated signal on the lead 14 is also coupled to another sample and hold detector 20 which is similar to the detector 16. As described more fully below, the detector 20 is activated during the interval of the VIR color burst, thereby to store on a capacitor C2 a voltage representative of the amplitude of that color burst. The voltages on the capacitors C1 and C2 can be used, therefore, as a differential error signal representing the amplitude difference, if any, between the VIR color burst and the VIR chrominance reference. That error signal may then be used to correct the amplitude of the video chrominance.

To activate the detector 20, the illustrated embodiment of the invention uses a burst gate generator 22 and an AND gate pulse noise gate 24. The burst gate generator develops, on lead 26, a flyback-derived gate pulse which has a typical duration of about 4.5 microseconds and which is approximately centered in time with the midpoint of the VIR color burst. Conventionally, this gate pulse would be coupled directly to the detector 20 to activate it during each VIR color burst interval. However, activating the detector 20 for a 4.5 microsecond duration could cause it to remain on for a short time after the termination of the VIR color burst. Because the detector 20 is bidirectional, i.e., it charges and discharges to follow amplitude changes in the signal which it samples, the detector 20 would respond not only to the peak amplitude of the VIR burst, but also that portion of the VIR signal immediately following the color burst. An erroneous output would, therefore, be developed across the capacitor C2. This problem is avoided by including the gate 24 which receives not only the 4.5 microsecond burst gate pulse from the burst gate generator generator 22, but also the sampling component (the VIR color burst) via the lead 14.

The gate 24 "ANDS" the gate pulse on the lead 26 with the sampling component which appears on the lead 14. In response to both these inputs, the gate 24 develops, on lead 28, a control or activation pulse which turns on the detector 20. Because of the "AND" function provided by the gate 24, the control pulse developed by the gate 24 has a duration which is no longer than the duration of either of its inputs. Because the demodulated VIR color burst has a duration of about 2.7 microseconds and the gating pulse on lead 26 has a duration of about 4.5 microseconds, the control pulse on lead 28 has a duration of no more than 2.7 microseconds. Accordingly, the detector 20 is turned on for a duration that is no longer than the VIR color burst, and its output is a truer representation of the peak amplitude of the VIR color burst.

In practice, it is preferred that the detector 20 be turned on for a duration which is less than the duration of the VIR color burst to avoid sampling on the leading and trailing slopes of the burst. Only the center portion of the burst is preferably sampled to derive a voltage which accurately represents the color burst's peak amplitude. This function is provided by the preferred embodiment of the gate 24 which is described hereinafter.

Another function of the gate 24 is to turn the detector 20 on during both positive-going and negative-going noise spikes which appear on the lead 14 during the VIR color burst interval. This "noise gate" function is also described in more detail below. Suffice it to say at this point that the advantage of turning the detector 20 on in this manner is that the effects of impulse noise on the voltage across the capacitor C2 are substantially averaged out by causing the detector 20 to sense both the positive-going spike and the negative-going spike which is frequently developed by impulse noise.

Before describing the embodiments of the gates 22 and 24 which are preferably used in a VIR correction system, it should be understood that it may be difficult to charge the capacitor C2 to the peak value of the VIR color burst in only 2.7 microseconds. This is particularly true where the capacitor C2 is charged by an integrated PNP transistor. To compensate for the PNP transistor's charging capability, the detector 20 is preferably enabled not only during the VIR color burst interval on line 19, but also during the intervals associated with standard color bursts which are transmitted during at least selected preceding lines. For example, the preferred embodiment causes the detector 20 to be enabled so as to sense the amplitude of the standard color bursts which occur during lines 14 through 18 and 20, and to sense the amplitude of the VIR color burst on line 19. Because standard color bursts and the VIR color burst have the same amplitude, the detector 20 operates as though it were detecting seven consecutive VIR color bursts rather than one VIR color burst and six standard color bursts.

Figure 3:
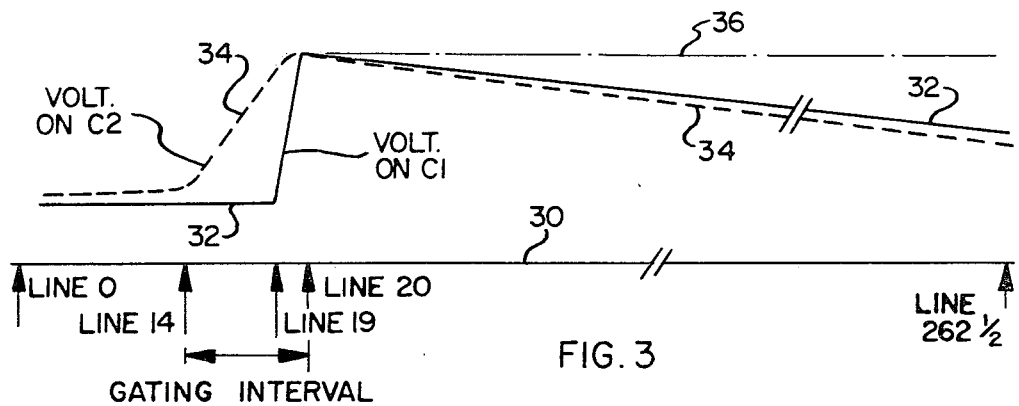
FIG. 3 shows waveforms which are useful in describing the operation of the preferred embodiment of the gating network.

To illustrate the effect of enabling the detector 20 during the burst intervals associated with lines 14–20, reference is made to FIG. 3. The line 30 illustrates the time interval associated with one television field, beginning with line zero and ending with line $262\frac{1}{2}$. At line 19, the sample and hold detector 16 is enabled for sampling the VIR chrominance reference signal to charge the capacitor C1. The solid line 32 illustrates how the capacitor C1 is charged. Because the VIR chrominance reference signal has a relatively long duration, the capacitor C1 becomes fully charged during line 19 and thereafter discharges slowly.

Because of the relatively short duration of the color bursts, the gate 24 turns the detector 20 on during each of the color burst intervals associated with lines 14 through 20. Hence, the voltage on the capacitor C2 begins increasing during line 14 (see dashed line 34) and steadily increases to the point where it is fully charged during line 20. It then begins discharging at a rate which is substantially equal to the rate of discharge of the capacitor C1. Hence, even though the voltages on capacitors C1 and C2 diminish, their voltage difference (the error signal) remains substantially constant.

If the detector 20 had been gated on during each line of the television field for sampling each standard color burst in addition to the VIR color burst, the voltage on the capacitor C2 would remain high as indicated by the line 36. This would prevent the capacitor C2 from discharging at the rate of discharge of the capacitor C1. Consequently, a large differential error would occur. This undesirable effect is avoided by fully charging the capacitors C1 and C2 and then permitting them to begin their discharge at approximately the same time.

In this example, the capacitor C2 begins its discharge one line later than does the capacitor C1, merely because it was convenient to turn the detector 20 on during lines 14 through 20 for this specific application. However, this difference in the time from which discharge begins is not substantial and has an unnoticeable effect on the differential error signal. If it is convenient to do so, the detector 20 may be turned on during lines 13 through 19 so that capacitors C1 and C2 can begin discharging at precisely the same time.

Figure 4:
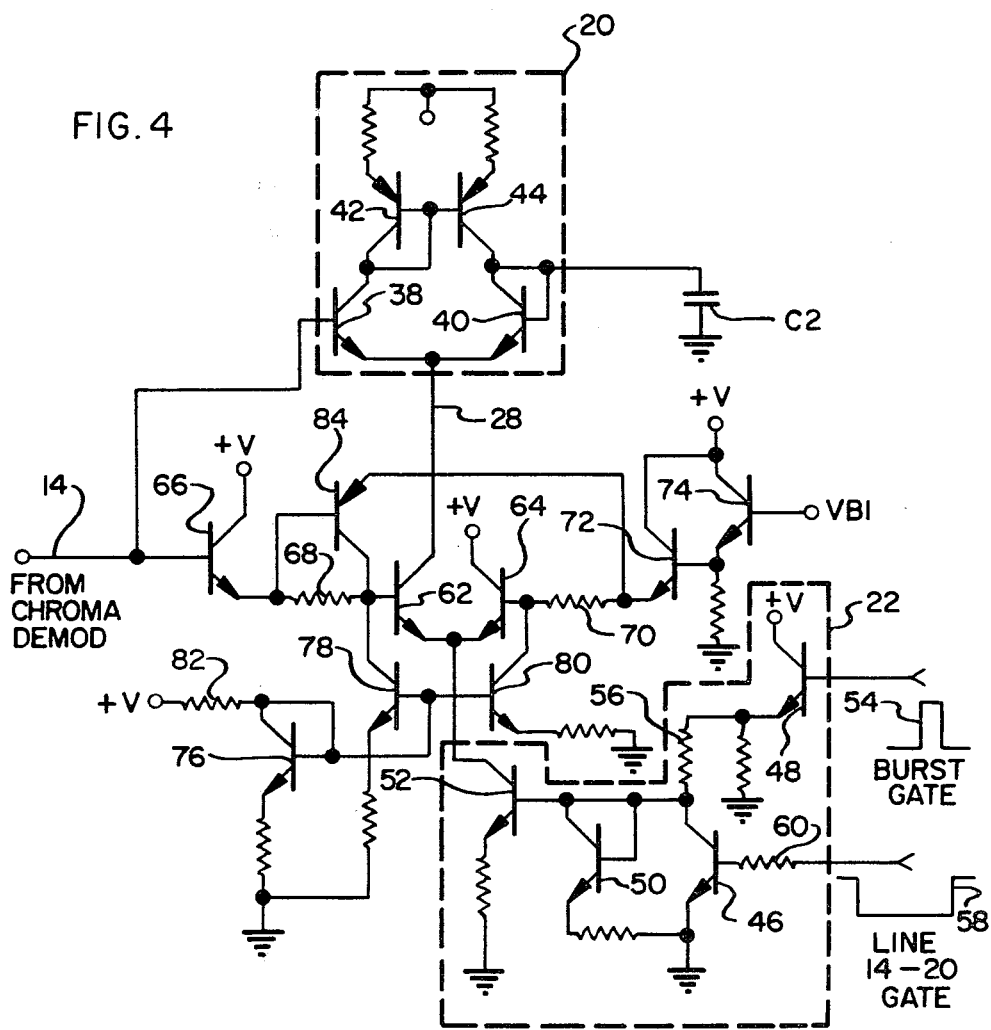
FIG. 4 shows a detailed circuit diagram of the preferred embodiment and the way in which it is coupled to an exemplary sample and hold detector.

Referring now to FIG. 4, the sample and hold detector 20 is shown as including transistors 38, 40, 42 and 44 which are interconnected with the capacitor C2. This type of detector and its operation is disclosed in U.S. application Ser. No. 99,371, filed Dec. 3, 1979, now U.S. Pat. No. 4,321,488. Suffice it to say that the detector 20 is enabled by current pulses in the lead 28 for sensing the peak amplitude of color bursts received via the lead 14. In this embodiment, such current pulses occur only during the color burst intervals of lines 14 through 20. Hence, the detector 20 is oblivious to demodulated information which appears on the lead 14 at times other than the occurrence of the current pulses on lead 28.

The burst gate generator 22 includes transistors 46, 48, 50 and 52. The rest of the illustrated circuitry forms the "AND" and noise gate functions of the gate 24. The function of the illustrated burst gate generator is to develop current gating pulses at the collector of transistor 52. These gating pulses are developed, in part, by applying a conventional flyback-derived burst gate pulse 54 to the base of the transistor 48.

The resultant positive voltage increase at the emitter of the transistor 48 is coupled via a resistor 56 to the bases of transistors 50 and 52. Were only the burst gate pulse 54 applied to the illustrated gating circuitry, the transistor 52 would be turned on during each burst interval for generating current gating pulses. To restrict those gating pulses to lines 14–20, a negative-going pulse 58 is applied via a resistor 60 to the base of the transistor 46. The pulse 58 is selected to have a duration which begins at line 14 and which ends at line 20 for turning the transistor 46 off during that interval. Outside the time interval associated with lines 14–20, the transistor 46 is held on. When the transistor 46 is on, it grounds the base of the transistor 52 to prevent conduction by the latter transistor. When the transistor 46 is turned off, the transistor 52 conducts in response to the burst gate pulse 54 which is applied to the transistor 48. With this arrangement, the transistor 52 develops current gating pulses which occur during each burst gate interval of lines 14–20.

The current gating pulses generated by the burst gate 22 are applied to the emitters of transistors 62 and 64 which are interconnected as a different amplifier. The sampling component is coupled to the base of the transistor 62 via a buffer transistor 66 and a resistor 68. The base of the transistor 64 receives a D.C. bias via a resistor 70 and a pair of buffer transistors 72 and 74. As described in more detail below, the transistors 62 and 64 are biased so that the transistor 62 is conductive only when it receives a current gating pulse from the transistor 52 and a color burst at its base. Under those conditions, a current control pulse is developed on the lead 28 to enable the detector 20. Moreover, a D.C. offset voltage is applied to the transistors 62 and 64 to reduce the interval during which the transistor 62 conducts. Specifically, the transistor 62 is rendered conductive only for a portion of the interval associated with each 4.5 microsecond current gating pulse from the transistor 52 so that the detector 20 is enabled substantially only during the peaks of each color burst which it samples.

The normal or non-offset bias for the transistors 62 and 64 is developed by transistors 66 and 72, and by resistors 68 and 70. The base of the transistor 66 receives a D.C. bias via the lead 14 which also carries the demodulated signal from the chroma demodulator. That D.C. bias and the A.C. demodulation components thereon are coupled via the emitter of the transistor 66 and the resistor 68 to the base of the transistor 62. The base of the transistor 74 receives a D.C. bias voltage indicated as VB1. The emitter of the transistor 74 is coupled to the base of the transistor 72 and the bias at the emitter of that transistor is coupled via the resistor 70 to the base of the transistor 64. The value of the bias voltage VB1 is selected such that the voltages at the emitters of transistors 72 and 66 are equal. Were this the only biasing circuitry for the transistors 62 and 64, they would be equally biased so that the transistor 62 would conduct pulses of current for enabling the detector 20 during the entire interval associated with the burst gate pulse 54. To reduce the interval for which the transistor 62 conducts, an offset bias is applied so that the transistor 62 conducts for a shorter interval than that normally associated with the pulse 54.

Toward this end, an offset voltage is derived by means of transistors 76, 78 and 80, and by selecting the resistor 68 to have a greater value than the resistor 70. Specifically, the collector of the transistor 76 is coupled via a resistor 82 to a positive voltage supply, with the base of the transistor 76 coupled to its collector. This establishes a predetermined current through the transistor 76. The bases of transistors 78 and 80 are also connected to the base of the transistor 76, wherefore each of the latter transistors mirrors a current in its collector which is substantially equal to the current carried by the transistor 76. Because the resistor 68 is greater in value than the resistor 70, a relatively large voltage drop occurs across it due to the collector current of transistor 78, whereas a relatively smaller voltage drop occurs across the resistor 70. Consequently, the voltage on the base of the transistor 64 is higher than the voltage on the base of the transistor 62, thereby rendering the transistor 62 non-conductive for the duration of the pulse 54 except when it receives a demodulation signal whose amplitude is sufficient to turn it on.

Because the current gating pulses developed in the collector of transistor 52 occur only during the burst gate interval, the transistor 62 can be turned on only when its base receives a demodulated burst whose amplitude is sufficient to raise the base bias on the transistor 62 high enough to overcome the offset bias. In practice, the various biasing resistors are selected so that a burst amplitude of approximately 400 millivolts is sufficient to turn the transistor 62 on. Thus, the transistor 62 is rendered conductive for approximately two microseconds during each of the color burst intervals associated with lines 14–20. At all other times, the transistor 62 remains off. Consequently, the detector 20 is conditioned to sample only the peaks of the demodulated color bursts which it receives via the lead 14 so that the capacitor C2 stores a voltage which is truly representative of the peak value of the color bursts.

As stated previously, the gate 24 may include a noise gate function to render the detector 20 less sensitive to impulse noise. Typically, a noise impulse which occurs during the burst interval will produce both a negative-going and a positive-going noise spike on the lead 14. The positive-going noise spike will be coupled to the detector 20 as well as to the gating network. The latter network will be turned on to enable the detector 20 to sample the positive-going spike. Since the detector 20 detects the positive-going portion of a noise impulse, it is preferred that it also be responsive to the accompanying negative-going spike so that, by sampling both the positive-going spike and the negative-going spike, the net effect of the capacitor C2 will be to average out the effects of the noise impulse. To do this, the detector gating network includes means for insuring that the detector 20 is turned on for noise spikes in either direction.

Toward this end, a PNP transistor 84 is coupled via its base to the emitter of transistor 66, via its collector to the base of the transistor 62, and via its emitter to the emitter of the transistor 72. As previously stated, the bias voltage VB1 is selected such that the voltage at the emitters of transistors 66 and 72 are equal. Consequently, the transistor 84 will normally be off and not affect circuit operation. However, when a negative-going noise spike occurs on the lead 14, the voltage at the emitter of the transistor 66 will be driven correspondingly negative. Consequently, the transistor 84 will be driven on to inject a current into the base of the transistor 62. The latter transistor is then turned on so that the detector 20 can sample the negative-going noise spike. Because the transistor 62 will also be turned on when a positive-going noise spike occurs, the detector 20 is enabled for sampling during positive-going and negative-going noise spikes so that the average effect of the noise spikes is reduced to nearly zero.

It will be appreciated that the gating network described above causes its associated sampling circuit to develop an accurate output, even in the presence of impulse noise. It is particularly useful in applications where a fast acting sampling circuit must detect a sampling component having a very short duration. The VIR burst gate is but one example of the type of sampling component for which the gating network is well suited.

In light of the foregoing description, it will be obvious to those skilled in the art that many modifications and alterations may be made to the disclosed embodiment without departing from the invention. Accordingly, it is intended that all such alterations and modifications be included within the spirit and scope of the invention as defined by the appended claims.

What is claimed is:

1. A gating network for selectively activating and deactivating a sampling circuit which receives an input signal having a sampling component to be sensed, comprising:
   a pulse generator for generating an enabling pulse which is in time synchronism with the sampling component;
   biasing means;
   an AND gate responsive to the enabling pulse and the signal containing the sampling component, the AND gate being biased by said biasing means such that it is responsive only to a sampling component of a selected amplitude so as to generate a control signal whose duration is shorter than both the sampling component and the enabling pulse; and
   means for coupling the control signal to the sampling circuit to enable the latter circuit in synchronism with the sampling component.

2. A gating network as set forth in claim 1 wherein said AND gate includes first and second transistors interconnected as a differential amplifier, wherein the enabling pulse is applied to the emitters of said transistors, wherein the sampling component is applied to the base of said first transistor, and wherein the control signal is developed in the collector of said first transistor.

3. A gating network as set forth in claim 2 including means for biasing said transistors such that said first transistor is turned on, during enabling pulses, in response to a sampling component of a selected amplitude so as to generate a control signal whose duration is shorter than the duration of the sampling component.

4. A gating network as set forth in claim 1 for use in a VIR correction system in which the input signal is a television signal having a VIR color burst on line nineteen thereof and standard color bursts on other lines, and wherein said pulse generator develops an enabling pulse in synchronism with the VIR color burst on line nineteen and additional enabling pulses during standard color burst intervals on other selected lines.

5. A gating network as set forth in claim 4 wherein said pulse generator develops enabling pulses during the color burst intervals of lines eighteen through twenty.

6. In a television receiver which develops a demodulated signal having a VIR color burst on line nineteen and standard color bursts on other lines, and which includes a sampling circuit to detect the amplitude of the demodulated VIR color burst, a gating network for activating the sampling circuit, comprising:
   a pulse generator for developing an enabling pulse in time synchronism with the VIR color burst and for developing additional enabling pulses in time synchronism with standard color bursts on selected lines preceding the VIR color burst;
   an AND gate responsive to the enabling pulses and the demodulated signal for developing control pulses whose durations are no longer than the durations of the color bursts; and
   means for coupling the control pulses to the sampling circuit to enable the latter circuit in synchronism with the color burst and the standard color bursts occurring during said selected lines.

7. A gating network as set forth in claim 6 including means for biasing said AND gate such that it is responsive only to color bursts of a selected amplitude so as to generate control pulses whose durations are shorter than the durations of the color bursts.

8. A gating network as set forth in claim 7 wherein said AND gate includes first and second transistors interconnected as a differential amplifier, wherein the enabling pulses are applied to the emitters of said transistors, wherein the demodulated signal is applied to the base of said first transistor, and wherein the control signal is developed in the collector of said first transistor.

9. A gating network as set forth in claim 8 wherein said pulse generator includes a third transistor for applying enabling current pulses to the emitters of the differential amplifier, a fourth transistor receiving a gate pulse whose duration is substantially equal to the duration of line 19 and said selected lines and coupled to said third transistor for holding it off outside the interval associated with line 19 and said selected lines, and a fifth transistor which receives a burst gate in time synchronism with the color bursts and which is coupled to said third transistor so as to enable it during color burst intervals, whereby said third transistor develops current gating pulses during color burst intervals of line nineteen and said selected lines.

* * * * *